United States Patent Office 2,795,558
Patented June 11, 1957

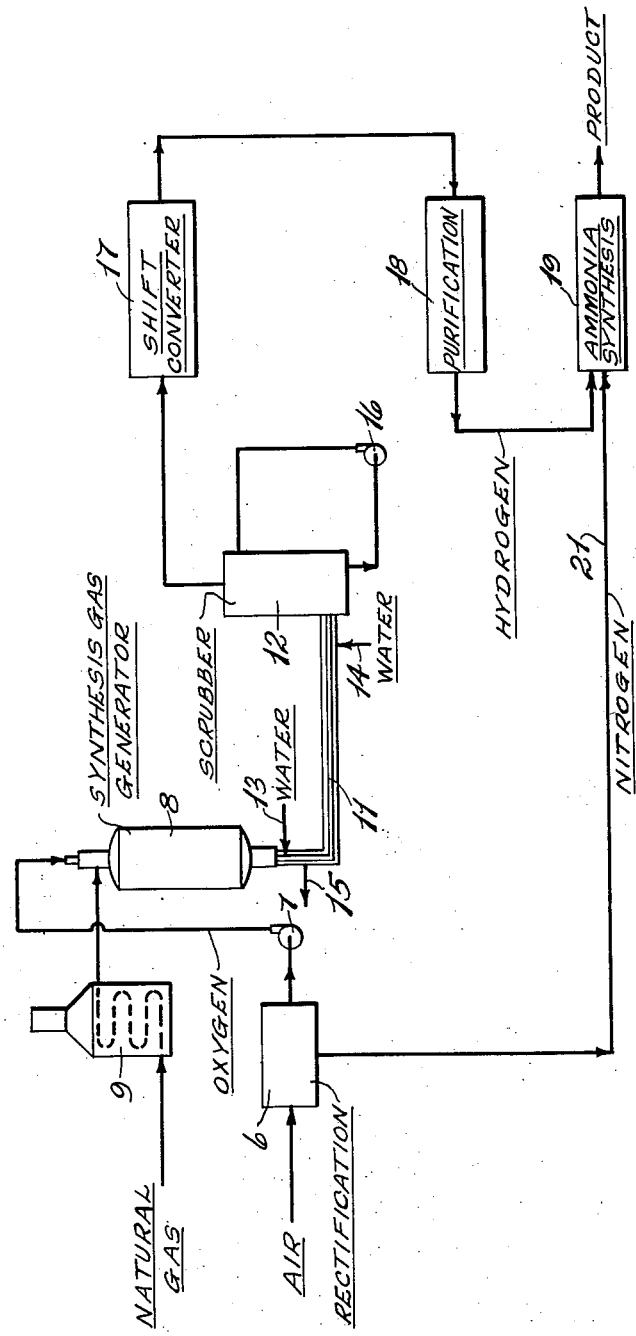

2,795,558

PRODUCTION OF AMMONIA SYNTHESIS FEED GAS

Du Bois Eastman, Whittier, Calif., assignor to The Texas Company, New York, N. Y., a corporation of Delaware Application January 15, 1953, Serial No. 331,443

3 Claims. (Cl. 252—374)

This invention relates to a process for the production of ammonia synthesis feed gas. In one of its more specific aspects this invention relates to an improved method for the production of a mixture of hydrogen and nitrogen in the required proportions for the synthesis of ammonia.

In the synthesis of ammonia, a feed gas containing three parts hydrogen by volume per part of nitrogen is required. Various methods have been devised for the production of hydrogen for ammonia synthesis and for blending the hydrogen with nitrogen in the required proportions. Hydrocarbons, particularly gaseous hydrocarbons, are especially suited for the production of hydrogen by reaction with steam or oxygen. Partial oxidation of a hydrocarbon with either steam or oxygen produces a mixture of carbon monoxide and hydrogen. The carbon monoxide may then be reacted with steam to produce carbon dioxide and hydrogen; one volume of hydrogen is produced for each volume of carbon monoxide reacted. Following the addition of nitrogen and the removal of carbon dioxide and other undesired components, ammonia synthesis feed gas is obtained.

The synthesis of ammonia is effected by reacting nitrogen with hydrogen. Three volumes of hydrogen are required per volume of nitrogen. The ammonia synthesis reaction is conducted at a pressure of several thousand pounds per square inch, suitably 5,000 and higher, and an elevated temperature, suitably around 950° F. A catalyst is used; for example, a catalyst prepared from magnetic iron oxide promoted with the oxides of potassium and aluminum and subsequently reduced to metallic iron, is used commercially. In commercial operations, low conversion per pass is obtained, i. e., only a limited amount of the nitrogen-hydrogen mixture is converted to ammonia each time it passes over the catalyst. A conversion of 8 to 12 percent per pass may be expected commercially. Unconverted nitrogen and hydrogen are recycled.

Two of the most important industrial processes for the production of ammonia synthesis feed gas, at the present time, are the steam-hydrocarbon reaction and the oxygen-hydrocarbon reaction.

In the steam-hydrocarbon reaction, steam and a gaseous hydrocarbon are reacted in the presence of a catalyst to produce a mixture of carbon monoxide and hydrogen. Natural gas, for example, is mixed with steam and passed over a nickel oxide catalyst in a first reactor at a temperature within the range of from about 1,200 to about 1,500° F., to yield carbon monoxide and hydrogen. A small amount of hydrocarbon, generally, less than about 5 percent of the initial feed remains unconverted in the effluent gas from the first reactor. The effluent gas is mixed with additional steam and a sufficient amount of air to supply the nitrogen required for the subsequent ammonia synthesis reaction. The resulting mixture is reacted in a second reactor in the presence of a nickel oxide catalyst at a temperature within the range of from about 1,500 to about 1,850° F. In the second reactor, the oxygen from the air is completely consumed. The oxygen combines with unreacted hydrocarbons from the first reactor to produce additional carbon monoxide and hydrogen. At the same time, however, the oxygen from the air converts a considerable quantity of the carbon monoxide and hydrogen, about 15 percent, to carbon dioxide and water vapor. The result is a net loss of carbon monoxide and hydrogen.

More recently the partial oxidation of hydrocarbons with oxygen to carbon monoxide and hydrogen has been developed commercially. A feed hydrocarbon, for example, natural gas, is reacted with commercial oxygen in a closed reaction zone at a temperature above about 2,000° F. Oxygen is obtained by rectification of air. The carbon monoxide and hydrogen obtained by the partial oxidation reaction may be subjected to reaction with steam to produce additional hydrogen as explained hereinabove. After removal of carbon dioxide and unconverted carbon monoxide, a stream of substantially pure hydrogen is obtained.

Carbon monoxide is usually converted to carbon dioxide by reaction with steam to produce additional hydrogen at about 750° F. in the presence of an iron catalyst. Iron oxide promoted with oxides of chromium, potassium, magnesium and aluminum, is a commercial catalyst for this reaction. After purification, in which carbon dioxide and carbon monoxide are removed from the gas stream, the purified mixture of hydrogen and nitrogen required as synthesis feed gas is obtained. Carbon dioxide may be removed by scrubbing the gas with water or an amine, e. g., monoethanolamine, or by a combination of these procedures. Carbon monoxide may be removed by scrubbing the gas with an aqueous solution of cuprous ammonium chloride ($Cu(NH_3)_2Cl$), which also removes carbon dioxide. Various other salts may be used as are known in the art. A caustic wash, i. e., contact between the gas and a solution of sodium hydroxide, is also sometimes used to effect substantially complete removal of carbon dioxide from the synthesis feed gas before it is passed to the ammonia synthesis reactor.

This invention provides an improved process for the production of nitrogen and hydrogen in the proportions required for the synthesis of ammonia from a hydrocarbon and air.

In accordance with this invention, air is rectified to produce an oxygen-rich fraction, preferably containing in excess of 95 volume percent oxygen, and a nitrogen fraction preferably containing in excess of 99 percent nitrogen. The oxygen fraction is reacted with a carbonaceous fuel in a compact, unpacked reaction zone at a temperature above about 2,000° F. The product gas is quenched with water to a temperature not above about 600° F. and preferably not above about 450° F., subjected to the water-gas shift reaction and treated for the removal of carbon oxides. The resulting stream of hydrogen is then mixed with sufficient nitrogen from the air rectification step to provide one part nitrogen by volume for every three parts of hydrogen.

The process of our invention will be more readily understood by reference to the following detailed example and the accompanying drawing. The drawing is a diagrammatic view illustrating a preferred form of the process of our invention.

With reference to the drawing, air is rectified in a rectification plant 6 at about 80 pounds per square inch gauge to yield oxygen of approximately 95 percent purity by volume and nitrogen of approximately 99.7 percent purity. The air rectification plant is of conventional design and is not, per se, a part of our invention. A stream of oxygen from the rectification plant is passed to a compressor 7 and delivered at 340 lbs. per square inch gauge and at the compressor discharge temperature (approximately 295° F.) to a synthesis gas generator 8. Natural gas of the following composition expressed as volume percent, is preheated in a heater 9 to a temperature of 915° F. and passed to the synthesis gas generator 8.

*Natural gas composition*

| | |
|---|---|
| Methane | 87.1 |
| Ethane | 7.9 |
| Propane and heavier | 2.0 |
| Nitrogen | 1.9 |
| Carbon dioxide | 1.1 |

The oxygen and natural gas are introduced separately into the generator through a burner comprising a central oxygen passage and an annular passage for hydrocarbon gas. The two reactants are mixed with one another at the point of discharge from the burner into the synthesis gas generator. A suitable burner is disclosed in the copending application of Bruce H. Sage, Leon P. Gaucher, and duBois Eastman, S. N. 244,358, filed August 30, 1951 (34,521).

The synthesis gas generator is a compact, unpacked reaction zone having a relatively small amount of surface in relation to its volume. A preferred synthesis gas generator is disclosed in U. S. Patent 2,582,938 to duBois Eastman and Leon P. Gaucher. The synthesis gas generator is autogenously maintained at a temperature above about 2250° F. by reaction between the oxygen and natural gas. In this specific example, the generator is operated at a pressure of about 340 lbs. per square inch gauge and a temperature of approximately 2600° F. Natural gas is fed at the rate of 5,583,000 std. cu. ft. per day, and oxygen of 95 volume percent purity, at the rate of 180 tons per day. The residence time of the gases in the generator, based on the volume of the product gas, is about 3.5 seconds.

In this specific example, the product gas from the synthesis gas generator, prior to quenching, has the following approximate composition.

| | Volume percent |
|---|---|
| Carbon monoxide | 32.4 |
| Hydrogen | 53.8 |
| Carbon dioxide | 1.8 |
| Water | 10.0 |
| Methane | 0.2 |
| Nitrogen, argon and trace components | 1.8 |

The synthesis gas stream consisting essentially of hydrogen and carbon monoxide and containing less than about 0.5 percent residual methane by volume, is discharged from the synthesis gas generator 8 through transfer line 11 to the base of a saturator-scrubber 12. Quench water is injected directly into transfer line 11 through line 13. Sufficient water is introduced into the gas stream to reduce the temperature to a temperature not above about 600° F., and preferably not above 450° F. This results in extremely rapid cooling, quenching the reaction and freezing the composition of the product gas. From about 0.5 to about 1.0 mol of water per mol of product gas is required. In this specific example, 0.75 mol water is used per mol of product gas, with the result that the temperature is reduced to about 450° F. With intimate contact between the gas and the water, as is obtained by injecting the water directly into the hot gas stream leaving the generator, the temperature reduction occurs in not more than about 0.2 second. Quenching of the gas by this particular method prevents the production of undesirable hydrocarbons in the gas stream by synthesis during cooling and prevents reactions leading to the formation of undesirable carbon dioxide and free carbon. Water is circulated through a water jacket surrounding line 11, the cooling water entering the water jacket from line 14 and leaving through line 15.

The cooled gases and unvaporized quench water enter the saturator-scrubber 12 where the gas is further scrubbed with water continuously recirculated from the bottom to the top of the vessel by pump 16. Two bubble-cap trays are provided in this vessel to insure intimate contact between the water and the gas. The water-washed gas is discharged from the top of the saturator-scrubber.

The direct water quench and the saturator-scrubber serve a three-fold purpose: the hot gases are cooled to the desired temperature of 450° F.; carbon or gum-forming compounds, if any, which might be produced in the generator are removed from the gas stream; and the gas is saturated with water at 450° F. and at approximately 340 pounds per square inch gauge, thus providing a substantial portion of the water vapor required for a subsequent shift conversion step.

The gas stream from the saturator-scrubber is passed into a shift converter 17. In the shift converter, the carbon monoxide, which comprises approximately 30 percent by volume of the synthesis gas, is almost completely reacted with water vapor in the presence of an iron catalyst to form equivalent amounts of hydrogen and carbon dioxide. The product gas from the shift converter is at a temperature of about 750° F. and contains approximately 2 percent by volume residual carbon monoxide on a dry, carbon dioxide-free basis.

The product gas from the shift converter passes to a purification unit 18 where it is cooled to 110° F. Condensate water is separated from the gas which is then contacted with monoethanolamine solution for the removal of carbon dioxide. The resulting gas stream consisting essentially of hydrogen, but still containing small amounts of carbon monoxide and carbon dioxide is then contacted with a ten percent solution of sodium hydroxide.

The purified hydrogen stream is passed to the ammonia synthesis unit together with a stream of nitrogen supplied through line 21 from the air rectification plant. This process produces a feed gas stream of unusually high purity.

It will be understood that the foregoing detailed description and specific example is for the purpose of illustrating a preferred embodiment of the present invention. It is to be understood however, that pressures recited there in are illustrative and that the process may be operated at suitably higher or lower pressure, for example, from about atmospheric pressure to 600 pounds per square inch gauge or higher.

Obviously, many modifications and variations of the invention as hereinabove set forth may be made without departing from the spirit and scope thereof, and therefore only such limitations should be imposed as are indicated in the appended claims.

I claim:

1. In a process for the production of hydrogen wherein a hydrocarbon is reacted with oxygen at an elevated pressure and a temperature above 2000° F. in a synthesis gas generation zone yielding a product gas stream consisting essentially of carbon monoxide and hydrogen, and the carbon monoxide in said product gas stream is subjected to reaction with steam in a shift conversion zone to produce additional hydrogen, the improvement which comprises intimately contacting said product gas stream at said reaction temperature and pressure directly with liquid water thus effecting vaporization of a portion of the water in an amount within the range of 0.5 to 1.0 mol of water per mol of said product gas, increasing the steam content of said product gas stream and cooling of said product gas stream to a temperature not above 600° F., said liquid water being supplied in an amount at least sufficient to saturate said gas stream at said pressure and said reduced temperature; and passing the resulting product gas stream containing steam resulting from vaporization of said water into a shift reaction zone at substantially said reaction pressure effecting conversion of carbon monoxide to carbon dioxide with concomitant production of hydrogen.

2. In a process for the production of hydrogen wherein hydrocarbon is reacted with oxygen at an elevated pressure and a temperature above 2000° F. in a synthesis gas generation zone yielding a product gas stream consisting essentially of carbon monoxide and hydrogen and containing free carbon, and the carbon monoxide in said product gas stream is subjected to reaction with steam in a shift conversion zone to produce additional hydrogen, the improvement which comprises intimately contacting said product gas stream at said reaction temperature and pressure directly with liquid water effecting vaporization of water in an amount within the range of 0.5 to 1.0 mol of water per mol of said product gas and cooling of said product gas stream to a temperature not substantially above 600° F. and substantially the boiling point of the water at said pressure, said liquid water being supplied in an amount at least sufficient to saturate said gas stream at said pressure and said reduced temperature, scrubbing said gas stream with water at said pressure and reduced temperature, and passing the resulting product gas stream containing steam resulting from vaporization of said water into a shift reaction zone at substantially said reaction pressure effecting conversion of carbon monoxide to carbon dioxide with concomitant production of hydrogen.

3. A process as defined in claim 2 in which the pressure in said reaction zone is about 340 p. s. i. g. and said product gas is cooled to about 450° F. and substantially saturated with water vapor at said pressure and temperature in said contacting step.

References Cited in the file of this patent

UNITED STATES PATENTS

| | | |
|---|---|---|
| 1,765,535 | Jones | June 24, 1930 |
| 1,794,231 | Humphrey | Feb. 24, 1931 |
| 1,898,967 | Schneider et al. | Feb. 21, 1933 |
| 2,582,936 | Galocsy et al. | Jan. 15, 1952 |
| 2,582,938 | Eastman et al. | Jan. 15, 1952 |
| 2,638,452 | Maryland et al. | May 12, 1953 |
| 2,660,521 | Teichmann | Nov. 24, 1953 |